June 17, 1930. A. FRYKMAN 1,764,785
TIRE CHAIN
Filed April 4, 1928
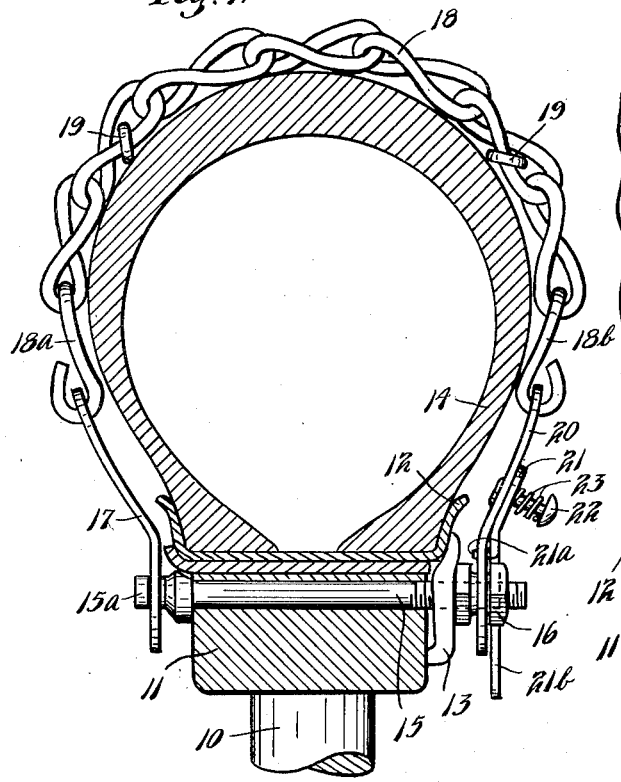
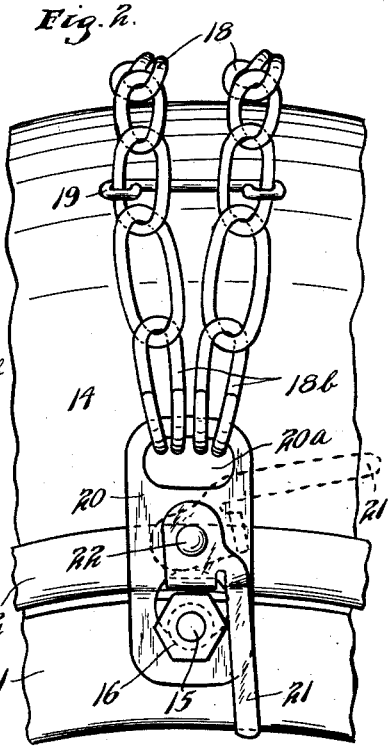
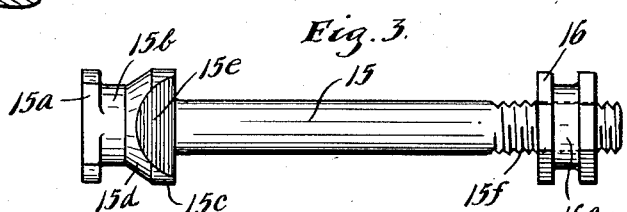
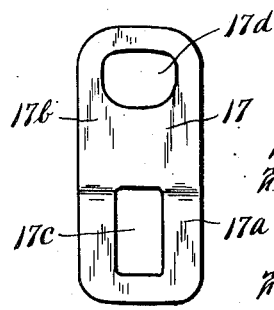
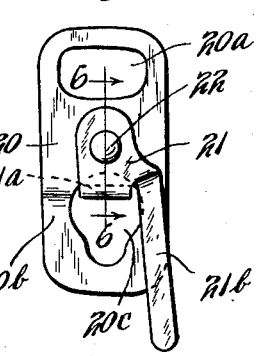
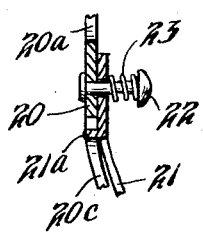
INVENTOR.
AUGUST FRYKMAN.
BY HIS ATTORNEYS.

Patented June 17, 1930

1,764,785

UNITED STATES PATENT OFFICE

AUGUST FRYKMAN, OF BOTTINEAU, NORTH DAKOTA

TIRE CHAIN

Application filed April 4, 1928. Serial No. 267,194.

This invention relates to an anti-skidding device or traction device for a vehicle such as an automobile, and particularly to a cross chain adapted to pass around a vehicle or automobile tire such as the ordinary pneumatic tire now used on automobiles.

It is an object of this invention to provide a simple and efficient form of cross chain which can be easily and quickly applied to or removed from the tire and wheel.

It is a further object of the invention to provide a cross chain adapted to be attached to a bolt which may replace the standard rim bolts, said bolt and chain having co-operating parts designed to be readily connected in locked position, or readily disconnected when not desired for use.

It is another object of the invention to provide a cross chain comprising a plurality of strands extending transversely around a tire, alined links in the respective strands being connected by rigid bars secured thereto and extending longitudinally of the tire, said strands having plates at their ends readily attachable and detachable from the rim bolt passing through the felloe of the wheel.

These and other objects and advantages of the invention will be fully set forth in the following description made in connection with the accompanying drawings, in which like reference characters refer to similar parts throughout the several views and in which:—

Fig. 1 is a radial section through the wheel and tire, showing the cross chain applied thereto;

Fig. 2 is a partial view in side elevation of the wheel showing the cross chain in said elevation;

Fig. 3 is a view in side elevation of the rim bolt used;

Fig. 4 is a view in front elevation of the plate at one end of the chain;

Fig. 5 is a view in front elevation of the plate used at the other end of the chain; and Fig. 6 is a vertical section taken on line 6—6 of Fig. 5 as indicated by the arrows.

Referring to the drawings, a portion of the wheel such as now commonly used in an automobile, is shown, comprising the spokes 10, the felloe 11, the rim parts 12, the rim clamping lugs 13, and the tire 14 which is held in the rim 12. Rim clamping bolts 15 are provided, which are of special form and may replace the standard rim clamping bolts which are furnished with the wheel. The bolt 15 comprises a head portion 15$^a$ which is of narrow or flattened form, having end portions which project beyond the cylindrical portion 15$^b$ immediately in the rear of the head portion 15$^a$. Adjacent the portion 15$^b$ the bolt has the enlarged cylindrical portion 15$^c$ connected to portion 15$^b$ by the frusto-conical portion 15$^d$. The portions 15$^d$ and 15$^c$ are flattened at one side or provided with a plane surface 15$^e$ sloping inwardly toward the axis of the bolt at an angle of about 30° to said axis. The inner side of portion 15$^c$ is formed as a flat surface extending at right angles to the axis of the bolt and the bolt extends from this surface with a uniform diameter to its end, the same having the usual threaded portion 15$^f$. A nut 16 is provided for the bolt, illustrated as of hexagon shape, the same having an intermediate cylindrical portion 16$^a$ of reduced diameter. A plate 17 is provided, having a general rectangular form, having one end portion 17$^a$ substantially flat and the other and longer portion 17$^b$ curved outwardly at an angle to portion 17$^a$ as shown in Fig. 1. The portion 17$^a$ is provided with a rectangular slot 17$^c$ of a size to pass freely over the head 15$^a$, said slot having a width slightly greater than the diameter of portion 15$^b$ of bolt 15. The plate 17 has an opening 17$^d$ adjacent one end into which are linked the end links 18$^a$ of a pair of cross chains 18, said chains being illustrated as formed of twisted links. While the number of the strands of chain 18 may be varied, in the embodiment of the invention illustrated, two are shown and these strands or separate chains have some of their alined links connected by rigid rods 19 having their ends bent tightly around the outer sides of said alined links as shown in Fig. 2 to prevent chains 18 from turning so that the plane of the links intersects the tire. The chains 18 have the end links 18$^b$ at the ends opposite links 18$^a$ hooked through an opening 20ª in a plate 20, which plate is of general rectangular form and has a curved portion at its end connected to the chain 18 and a straight flat portion 20ᵇ at its free end. The plate 20 also has an opening 20ᶜ disposed mostly in portion 20ᵇ, which opening is largely of circular shape, but has a semi-circular extension at its lower or outer end. The plate 20 has pivoted thereto a small lever 21 having the central portion 21ª bent inwardly substantially at right angles and being of a width to substantially fit in the upper end of opening 20ᵇ. The lever 21 has a downwardly projecting handle portion 21ᵇ. Said lever 21 is pivoted on a pivot 22 illustrated as riveted to plate 20 and a coiled spring 23 surrounds pivot 22, bearing at one end against lever 21 and at its other end against the head of pivot 22, said spring thus urging said lever towards plate 20.

In operation the bolts 15 will be used instead of the standard rim clamping bolts and placed through felloe 11. It will be seen from Fig. 1 that the flat portion 15ᵉ on bolt 15 will be disposed beneath the rim plate 12 so that bolt 15 will be held from rotation. When the chain is to be applied, plate 17 will be engaged with the bolt by alining slots 17ᶜ with the head 15ª and then turning said plate so that its longitudinal center line is at right angles to the longitudinal center line of head 15ª. The plate then cannot be moved off the bolt. The chain is then passed around the tire as shown in Figs. 1 and 2 and the plate 20 engaged with nuts 16 by having the opening 20ᶜ passed over the outer end of said nut, lever 21 at this time being swung to the dotted line position shown in Fig. 2. After plate 20 has thus been moved over nut 16, it is pulled upwardly slightly so that the semi-cylindrical extension of opening 20ᶜ engages with the reduced portion 16ª of nut 16 as shown in Fig. 2. Lever 21 is now swung down to the position shown in Figs. 2 and 5, lug 21ª snapping into the opening 20ᶜ by the pressure of spring 23 thus largely closing said opening and preventing plate 20 from moving downwardly where it could be disengaged. It will be seen that in this position the lower flat side of lug 21ª lies adjacent one flat side of the nut 16 and said nut is thus kept from turning on said bolt. The chain is thus now firmly locked in position on the bolt 15 and cannot be removed without moving the lever 21. This lever is locked in position by lug 21ª engaging an opening 20ᶜ and held therein by spring 23. The chains 18 will effectively act to secure good traction on muddy and slippery surfaces and will also act to prevent skidding of the car. The rods 19 hold the chains in separated position so that a large traction surface is obtained.

From the above description it is seen that applicant has provided a very simple and efficient anti-skid or traction device and one which can be very easily and quickly applied to the wheel or removed therefrom. The device comprises comparatively few parts and is simple and rugged in construction. The same has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. In a tread chain device of the class described, the combination of a bolt extending through the felloe of a tire equipped wheel, said bolt being constructed and arranged at one end to be held from rotation, a nut threaded on the other end of said bolt and having a reduced intermediate portion, a plate adapted to be secured to a tread chain, said plate having an aperture therethrough with a reduced portion at one end, said aperture being of a size to pass over said nut and said reduced portion being adapted to engage in said reduced intermediate portion of said nut, a member pivoted to said plate and having a portion adapted to move into said aperture when said plate is engaged over said nut and be disposed to engage one side of said nut and prevent rotation thereof.

2. In a tread chain device of the class described, the combination of a bolt extending through the felloe of a tire equipped wheel having means at one end constructed and arranged to prevent rotation of said bolt, a nut threaded on the other end of said bolt and having a reduced intermediate portion, a plate adapted to be secured to a tread chain, said plate having an aperture therethrough with a reduced portion at one end, said aperture being of a size to pass over said nut and said reduced portion being adapted to engage in said reduced intermediate portion of said nut, and a plate pivoted to said first mentioned plate having a flat lug struck up therefrom adapted to move into one end of said aperture and extend parallel to one side of said nut, said plate having an integral portion extending at one end thereof to form a handle for swinging the same.

3. In a tread chain device of the class described, the combination, of a bolt extending through the felloe of a tire equipped wheel said bolt being constructed and arranged to be held from rotation, a nut threaded on the other end of said bolt and having a reduced intermediate portion, a plate adapted to be secured to a tread chain, said plate having an aperture therethrough with a reduced portion at one end, said aperture being of a size to pass over said nut and said reduced portion being adapted to engage in said reduced intermediate portion of said nut, and a member pivoted to said plate at the side of said aperture opposite the reduced portion of said aperture, said member having a straight portion projecting toward said plate and adapted to move into said aperture and be disposed adjacent one side of said nut to prevent rotation thereof, and resilient means urging said member toward said plate to hold said projecting portion of said member in said aperture.

In testimony whereof I affix my signature.

AUGUST FRYKMAN.